(12) United States Patent
Masui et al.

(10) Patent No.: US 6,659,489 B2
(45) Date of Patent: Dec. 9, 2003

(54) COVER ASSEMBLY FOR PORTIONS OF BICYCLE

(75) Inventors: Takuji Masui, Osaka (JP); Stascha Offenbeck, Ottobrunn Bayern (DE); Hartmut Esslinger, Altensteig (DE); Nico Michler, Baden-Württemberg (DE)

(73) Assignee: Shimano Inc., Osaka (JP)

( * ) Notice: Subject to any disclaimer, the term of this patent is extended or adjusted under 35 U.S.C. 154(b) by 132 days.

(21) Appl. No.: 09/984,008

(22) Filed: Oct. 26, 2001

(65) Prior Publication Data

US 2003/0080530 A1 May 1, 2003

(51) Int. Cl.7 .................................................. B60R 9/10
(52) U.S. Cl. ..................... 280/304.3; 150/167; D12/126
(58) Field of Search .................................. 280/276, 279, 280/304.3, 288.4; D12/126, 153; 150/167

(56) References Cited

U.S. PATENT DOCUMENTS

| | | | | |
|---|---|---|---|---|
| 4,138,132 A | * | 2/1979 | Doyle | 280/289 G |
| D295,396 S | * | 4/1988 | Rudd et al. | D12/118 |
| 4,878,558 A | * | 11/1989 | Asakura | 180/219 |
| 4,944,340 A | * | 7/1990 | Tortorich | 150/167 |
| D313,774 S | * | 1/1991 | Hauer | D12/126 |
| 5,782,540 A | * | 7/1998 | Camfield et al. | 301/64.4 |
| 5,924,715 A | * | 7/1999 | Norem | 280/276 |
| 6,230,831 B1 | * | 5/2001 | Ogata et al. | 180/65.1 |
| D444,104 S | * | 6/2001 | Baker | D12/126 |

* cited by examiner

*Primary Examiner*—Avraham Lerner
(74) *Attorney, Agent, or Firm*—Shinjyu Global IP Counselors, LLP (57) ABSTRACT

A bicycle fork/hub cover assembly overlies a portion of a front fork and the ends of the front hub to change the appearance of the front portion of the bicycle. The cover assembly basically comprises an outside cover portion, an inside cover portion and snap-on fastening elements that couple the outside cover portion and the inside cover portion to a bicycle frame. The outside cover portion includes a right hub cover section, a left hub cover section, a right outside fork tube cover section, and a left outside fork tube cover section. The inside cover portion includes a right inside fork tube cover section, and a left inside fork tube cover section. The fastening elements are coupled to the outside cover portion and the inside cover portion.

40 Claims, 5 Drawing Sheets

COVER ASSEMBLY FOR PORTIONS OF BICYCLE

BACKGROUND OF THE INVENTION

1. Field of the Invention

This invention generally relates to a cover assembly for cover portions of a bicycle. More specifically, the present invention relates a cover assembly overlies the ends of a front bicycle hub and/or encloses the front fork of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In particular, the bicycle frame and the front fork are constantly being modified and/or improved depending upon their use. Moreover, these parts are often designed to be aesthetically pleasing to the rider. In other words, it is often desirable to produce bicycles that are attractive to the rider. In addition, many riders desire a bicycle that looks different than other bicycles. Many bicycle frames are designed to have a distinctive and attractive appearance. However, the front bicycle fork is typically design with very few ornamental features. In other words, front bicycle forks are typically designed only to carry out their intended function. This has resulted in most front bicycle forks looking alike.

Thus, if a rider wants to change the appearance of the bicycle, the rider can add various accessories to the vehicle such as fenders, lights, reflectors, etc. However, most of these accessories do not effect of the overall look of the front portion of the bicycle. More specifically, the overall appearance of the bicycle is typically dictated by the look of the front fork. These accessories do not typically change the appearance of the front fork.

In view of the above, there exists a need for a bicycle fork cover that changes the ornamental appearance of a bicycle. This invention addresses this need in the prior art as well as other needs, which will become apparent to those skilled in the art from this disclosure.

SUMMARY OF THE INVENTION

One object of the present invention is to provide a cover assembly that changes the ornamental appearance of the bicycle.

Another object of the present invention is to provide a cover assembly that is covers the ends of a front bicycle hub.

Another object of the present invention is to provide a cover assembly that is covers the tubes of a front bicycle fork.

Another object of the present invention is to provide a cover assembly that is relatively simple and inexpensive to manufacture.

Still another object of the present invention is to provide a cover assembly that is relatively easy to install and/or replace.

The foregoing objects can be attained by providing a cover assembly comprising a right hub cover section and a left hub cover section. The right hub cover section has a right side wall configured to cover a right hub end, and at least one right lower fastening element. The left hub cover section has a left enlarged part configured to cover a left hub end, and at least one left lower fastening element.

In accordance with another aspect of the present invention, the foregoing objects can be attained by providing a cover assembly comprising an outside cover portion, an inside cover portion and upper fastening elements that couple the outside cover portion and the inside cover portion to a bicycle frame. The outside cover portion includes a right outside fork tube cover section, and a left outside fork tube cover section. The inside cover portion includes a right inside fork tube cover section, and a left inside fork tube cover section. The upper fastening elements are coupled to the outside cover portion and the inside cover portion.

In a preferred embodiment of the present invention, the cover assembly overlies the ends of a front bicycle hub and encloses the fork tubes of the front fork of the bicycle. Preferably, the cover assembly can be installed without physically altering the bicycle frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
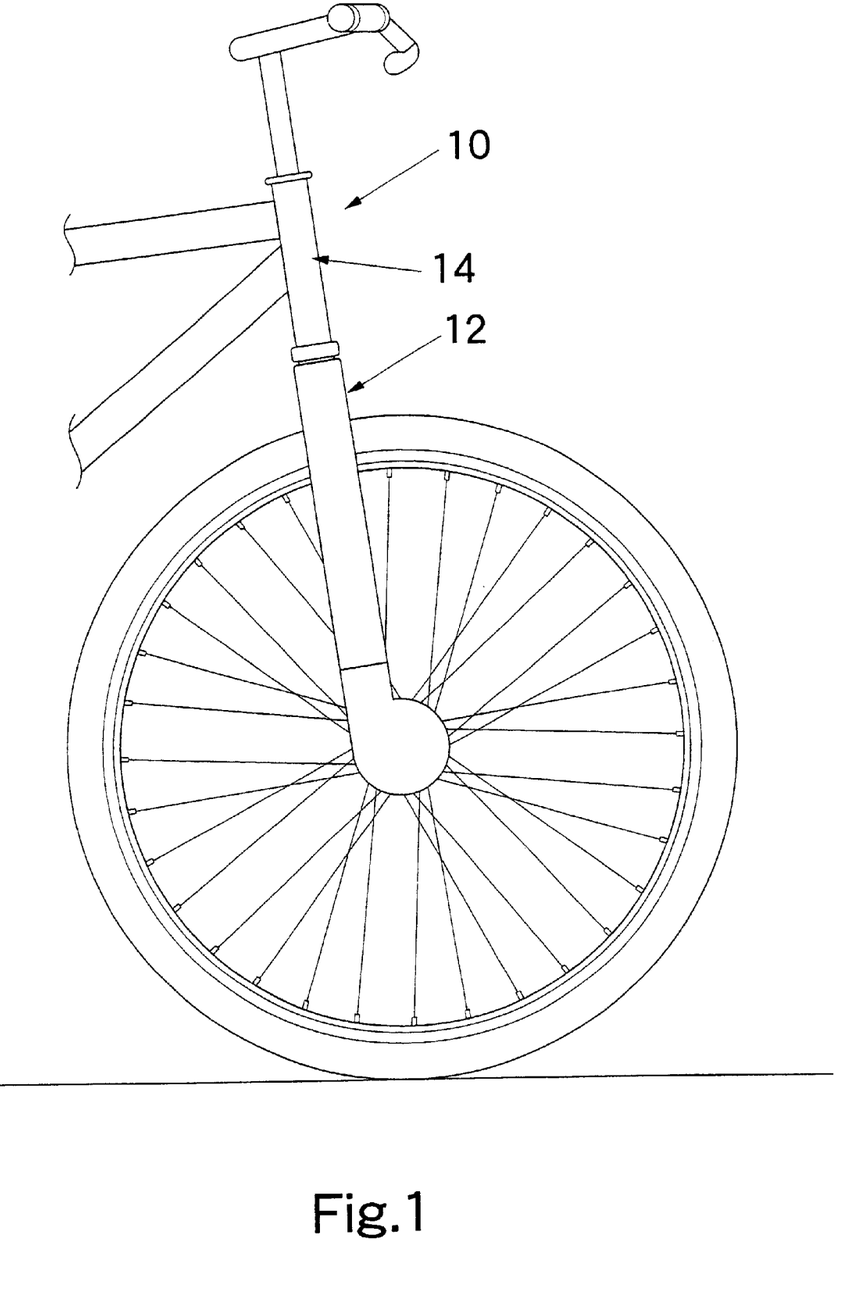
FIG. 1 is a side elevational view of a front portion of a bicycle with a bicycle fork cover coupled thereto in accordance with a first embodiment of the present invention.
Figure 2:
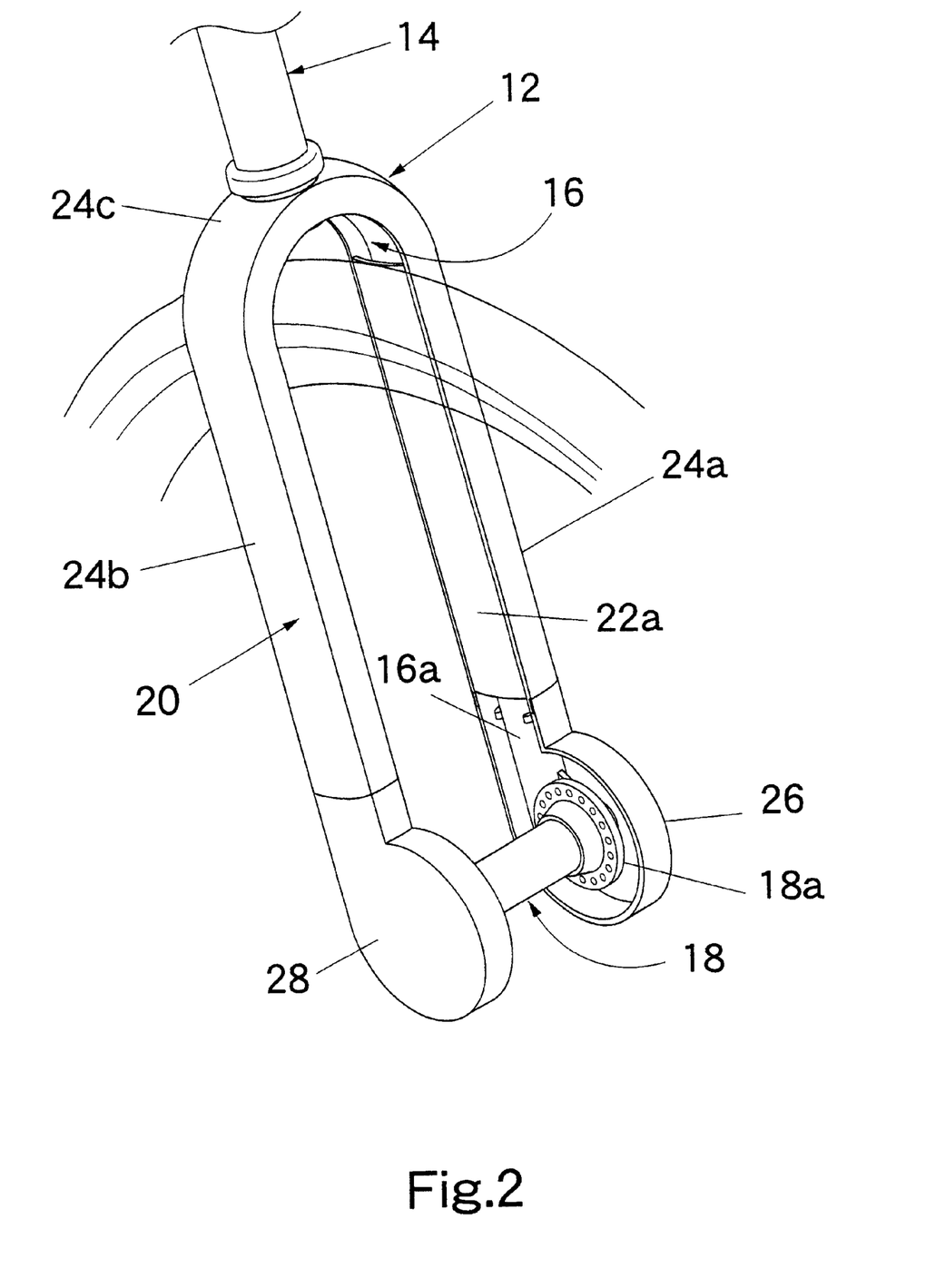
FIG. 2 is a side perspective view of the front fork of the bicycle enclosed in the bicycle fork cover of the first embodiment of the present invention.

Referring initially to FIG. 1, a front portion of a bicycle 10 is illustrated with a bicycle fork/hub cover assembly 12 coupled thereto in accordance with a first embodiment of the present invention as discussed below. Since these most of the parts of the bicycle 10 are well known in the art, the parts of the bicycle 10 will not be discussed or illustrated in detail herein, except for the parts relating to the bicycle fork/hub cover assembly 12 of the present invention.

The bicycle 10 basically has a frame 14 with a front fork 16 movably coupled thereto. A front hub 18 is coupled to the front fork 16. The bicycle fork/hub cover assembly 12 overlies the front fork 16 and the ends of the front hub 18. While the bicycle fork/hub cover assembly 12 is illustrated as having a certain overall ornamental appearance, it will be apparent to those skilled in the art from this disclosure that various changes and modifications can be to the ornamental appearance without departing from the scope of the invention. For example, the bicycle fork/hub cover assembly 12 can have a more aerodynamic configuration, which changes the ornamental appearance of the bicycle, while also adding to the aerodynamic configuration of the bicycle 10. Preferably, the bicycle fork/hub cover assembly 12 can be installed without physically altering the bicycle frame 14.

Basically, the bicycle fork/hub cover assembly 12 is constructed of five pieces that are securely coupled to the front fork 16 and the ends of the front hub 18. The various pieces of the bicycle fork/hub cover assembly 12 can be constructed of a variety of materials. For example, the pieces of the bicycle fork/hub cover assembly 12 can be constructed of a relatively hard rigid plastic material, a fiberglass material, a metallic material or any other suitable material can carry out the present invention. The type of manufacturing technique used to create the various parts of the bicycle fork/hub cover assembly 12 will change depending upon the type of material used. For example, the various parts of the bicycle fork/hub cover assembly 12 can be constructed by injection molding or by bending a sheet material and/or bending and securing sections together.

In the illustrated embodiments, the bicycle fork/hub cover assembly 12 includes an outer cover portion 20 formed of three parts and an inside cover portion 22 constructed of two parts. The inside cover portion 20 and the outside cover portion 22 are coupled together about the front fork 16 and the ends of the front hub 18 so as to form elongated right and left fork tubes that substantially cover the front fork 18 and the ends of the front hub 18.

The outside cover portion 20 basically includes an inverted U-shaped member 24 with right and left hub cover sections or members 26 and 28 coupled to the lower free ends of the inverted U-shaped cover member 24. Thus, the outside cover portion 20 is preferably constructed of three separate pieces that are joined together once assembled on the front fork 16 and the ends of the front hub 18. Of course, it will be apparent to those skilled in the art from this disclosure that these three pieces can be formed together as a one-piece, unitary member, or could be constructed of additional parts.

The inverted U-shaped cover member 24 basically includes right and left outside fork tube cover sections 24a and 24b with a middle section 24c extending between the upper ends of the right and left outside fork tube cover sections 24a and 24b. The right and left outside fork tube cover sections 24a and 24b are designed to cover the fork tubes 16 and 16b of the front fork 16. The middle section 24c has a center opening 24d that is designed to receive the fork post 16c of the front fork 16 therethrough. Preferably, the right and left outside fork tube cover sections 24a and 24b and the middle section 24c have a U-shaped transverse cross-section with a substantially uniform thickness. Of course, it will be apparent to those skilled in the art from this disclosure that other configurations could be utilized.

In the illustrated embodiments, the right and left outside fork tube cover sections 24a and 24b are straight sections. However, it will be apparent to those skilled in the art from this disclosure that the overall shape of the inverted U-shaped cover member 24 can have different shapes. For example, the inverted U-shaped cover member 24 can have a more aerodynamic shape such that use of the bicycle fork cover can decrease the wind resistance of the bicycle. Moreover, depending upon the shape of the front fork 16, the shape of the inverted U-shaped cover member can change accordingly. In other words, if the tubes 16a and 16b of the front fork 16 were curved, the right and left outside fork tube cover sections 24a and 24b could be curved to accommodate such a configuration.

The lower free ends of the right and left outside fork tube cover sections 24a and 24b have reduced portions 24c and 24f, respectively, formed therewith. The reduced sections 24e and 24f are received within the right and left hub cover members 26 and 28. In other words, the exterior surfaces of the reduced sections 24d and 24e are arranged relative to the exterior surfaces of the right and left outside fork tube cover sections 24a and 24b such that the exterior surfaces of the right and left hub cover members 26 and 28 lie flush with the exterior surfaces of the right and left outside fork tube cover sections 24a and 24b.

Preferably, the interior surfaces of the inverted U-shaped cover member 24 are provided with a plurality of fastening elements or C-shaped clips 30a and 30b. In the illustrated embodiment, the right outside fork tube cover section 24a is provided with three C-shaped clips 30a that are vertically spaced apart from each other. Likewise, the left outside fork tube cover section 24b also includes three fastening elements or C-shaped clips 30b that are vertically spaced apart from each other. Accordingly, the right and left outside fork tube cover sections 24a and 24b are substantially mirror images of each other.

The C-shaped clips 30a and 30b can be integrally molded with the inverted U-shaped cover member 24 or can be fastened thereto utilizing various fastening techniques as needed and/or desired. In any event, the C-shaped clips 30a and 30b are preferably fixed to the right and left outside fork tube cover sections 24a and 24b, respectively, to securely fasten the inverted U-shaped cover member 24 to the tubes 16a and 16b of the front fork 16. In the preferred embodiment, the C-shaped clips 30a and 30b have limited flexibility or resiliency such that the inverted U-shaped cover member 24 is secured to the tubes 16a and 16b of the front fork 16 via a snap fit. Of course, it will be apparent to those skilled in the art from this disclosure that other types of fastening elements can be utilized as needed and/or desired. For example, the fastening elements could be an adhesive or a fastener such as a screw. Of course, some of these other fastening techniques are less desirable because they increase the costs and/or the installation time. Preferably, the fastening elements are integrally formed with or secured to the inverted U-shaped cover member 24 so that there are no little parts that can be lost.

In accordance with one construction of the present invention, the inverted U-shaped cover member 24 can be constructed of a bendable sheet material that is bent and/or pressed to form the shape illustrated in the drawings. Thus, the sheet material will have a substantially uniform thickness with the C-shaped clips 30a and 30b securely fastened thereto. In accordance with another construction of the present invention, the U-shaped cover member 24 can be injected molded such that the thickness of the inverted U-shaped cover member 24 can very as needed and/or desired. Thus, the C-shaped clips 30a and 30b are integrally formed with the right and left outside fork tube cover sections 24a and 24b and the middle section 24c as a one-piece, unitary member when injected molding is used. Of course, it will be apparent to those skilled in the art from this disclosure that other conventional and unconventional manufacturing techniques can be utilized to construct the inverted U-shaped cover member 24 in accordance with the present invention.

Figure 3:
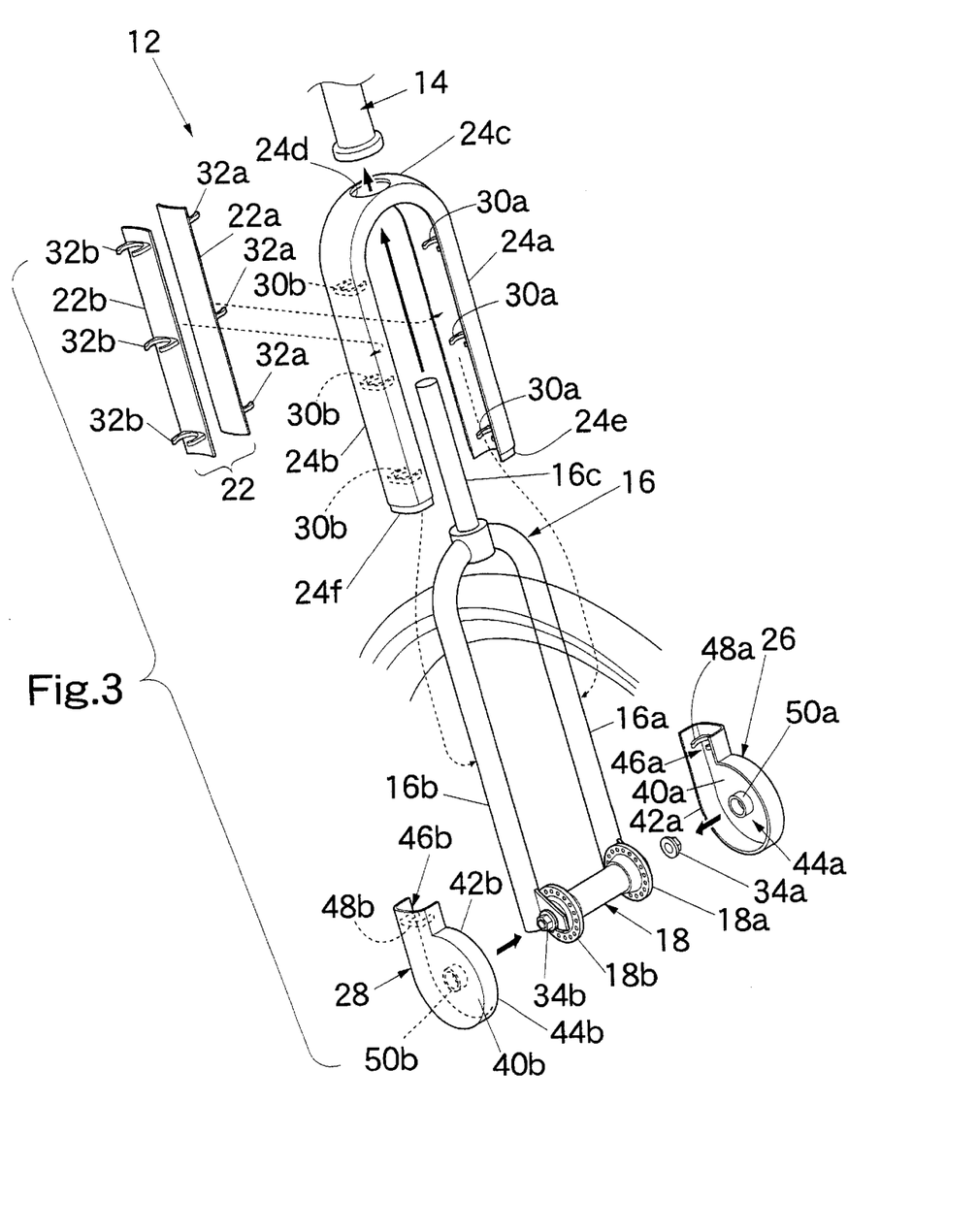
FIG. 3 is an exploded side perspective view of the front fork with the front hub and the bicycle fork cover in accordance with the first embodiment of the present invention.

Referring now to the inside cover portion 22, right and left inside fork tube cover sections 22a and 22b form the inside cover portion 22. The right and left inside fork tube cover sections 22a and 22b are preferably identical to each other as seen in FIG. 3. The right and left inside fork tube cover sections 22a and 22b are preferably elongated members that are shaped to mate with the right and left outside fork tube cover sections 24a and 24b to completely enclose a portion of the tubes 16a and 16b of the front fork 16. In the illustrated embodiment, the right and left inside fork tube cover sections 22a and 22b have a transverse cross section with a slight curvature thereto. Of course, the right and left inside fork tube cover sections 22a and 22b could be flat or have a different shape that could still carry out the present invention.

In the illustrated embodiment, the rights inside fork tube cover section 22a has three snap-on fastening elements in the form of C-shaped clips 32a that are rigidly coupled thereto. Likewise, the left inside fork tube cover section 22b has three snap-on fastening elements in the form of C-shaped clips 32b that are rigidly coupled thereto. Similar to the inverted U-shaped cover member 24, the fastening elements or C-shaped clips 32a and 32b can be integrally formed with the right and left inside fork tube cover sections 22a and 22b. Alternatively, the fastening elements or C-shaped clips 32a and 32b can be securely fastened to the right and left inside fork tube cover sections 22a and 22b depending upon the manufacturing techniques utilized to construct the bicycle fork/hub cover assembly 12. Moreover, it will be apparent to those skilled in the art from this disclosure that the fastening elements 30a, 30b, 32a and 32b could be designed such that the inside cover portion 22 is directly fastened to the inverted U-shaped cover member 24 instead of directly coupled to the fork tubes 16a and 16b of the front fork 16. Moreover, it will be apparent to those skilled in the art from this disclosure that various other arrangements of fastening elements can be utilized to secure the inverted U-shaped cover member and the inside cover sections 22a and 22b together.

Regarding the right and left hub cover members 26 and 28, these members are preferably mirror images of each other. The right and left hub cover members 26 and 28 are snap-fitted to both the fork tubes 16a and 16b and the end nuts 34a and 34b of the front hub 18. The right and left hub cover members 26 and 28 overlie the reduced sections 24e and 24f such that the exterior surfaces of the right and left hub cover members 26 and 28 lie flush with the exterior surfaces of the right and left outside fork tube cover sections 24a and 24b.

In the preferred embodiment, the right hub cover member 26 has a side wall 40a and a peripheral wall 42a extending substantially perpendicularly from the peripheral edge of the side wall 40a. The peripheral wall 42a has a right fork tube cutout for accommodating the right fork tubes 16a. The side wall 40a has a substantially planar exterior surface, while the peripheral wall 42a is a partial cylinder extending substantially perpendicularly from the peripheral wall 42a. The side wall 40a and the peripheral wall 42a are configured to form a right enlarged cup-shaped part 44a that covers the right spoke flange 18a.

The side wall 40a and a peripheral wall 42a are also configured to form a connecting part 46a that extends radially from the right enlarged cup-shaped part 44a to cover the lower free end of the right fork tube 16a. The connecting part 46a extends radially from the right enlarged cup-shaped part 44a at the right fork tube cutout for accommodating the right fork tubes 16a therein. The right connecting 46a is configured to mate with the reduced sections 24e of the right outside fork tube cover section 24a so as to provide an attractive appearance. Thus, the right connecting part 46a has a substantially U-shaped cross section that matches the U-shaped cross section of the right outside fork tube cover section 24a. The right connecting part 46a is provided with a snap-on fastening element in the form of a U-shaped clip 48a.

The right enlarged cup-shaped part 44a also includes a snap-on fastening element in the form of a right hub axle accommodating member 50a for frictionally engaging the fastening elements or nuts 34a of the front hub 18. In this embodiment, the right hub axle accommodating member 50a is a tubular flange extending from the side wall 40a of the right enlarged cup-shaped part 44a.

Likewise, the left hub cover member 28 has a side wall 40b and the peripheral wall 42b extending substantially perpendicularly from the peripheral edge of the side wall 40b. The peripheral wall 42b has a right fork tube cutout for accommodating the left fork tubes 16b. The side wall 40b has a substantially planar exterior surface, while the peripheral wall 42b is a partial cylinder extending substantially perpendicularly from the peripheral wall 42b. The side wall 40b and the peripheral wall 42b are configured to form a left enlarged cup-shaped part 44b that covers the left spoke flange 18b.

The side wall 40b and the peripheral wall 42b are also configured to form a connecting part 46a that extends radially from the left enlarged cup-shaped part 44b to cover the lower free end of the left fork tube 16b. The connecting part 46b extends radially from the left enlarged cup-shaped part 44b at the left fork tube cutout for accommodating the left fork tubes 16b therein. The left connecting 46b is configured to mate with the reduced section 24f of the left outside fork tube cover section 24b so as to provide an attractive appearance. Thus, the left connecting part 46b has a substantially U-shaped cross section that matches the U-shaped cross section of the left outside fork tube cover section 24b. The left connecting part 46b is provided with a snap-on fastening element in the form of a C-shaped clip 48b.

The left enlarged cup-shaped part 44b also includes a snap-on fastening element in the form of a left hub axle accommodating member 50b for frictionally engaging the fastening elements or nuts 34b of the front hub 18. In this embodiment, the left hub axle accommodating member 50b is a tubular flange extending from the side wall 40b of the left enlarged cup-shaped part 44b.

Second Embodiment

Figure 4:
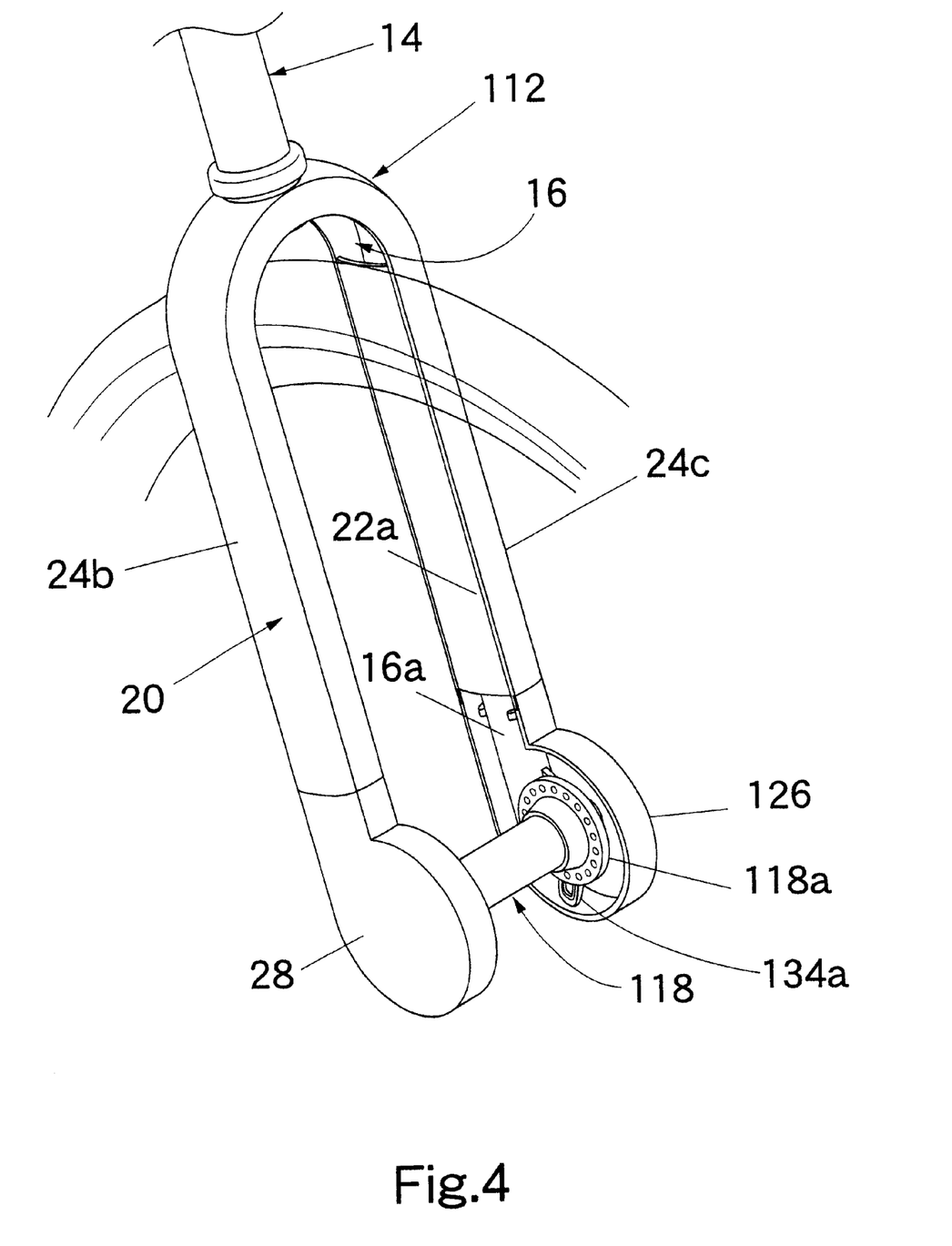
FIG. 4 is a side perspective view of a front portion of a bicycle with a quick release hub and a bicycle fork cover coupled thereto in accordance with a second embodiment of the present invention.
Figure 5:
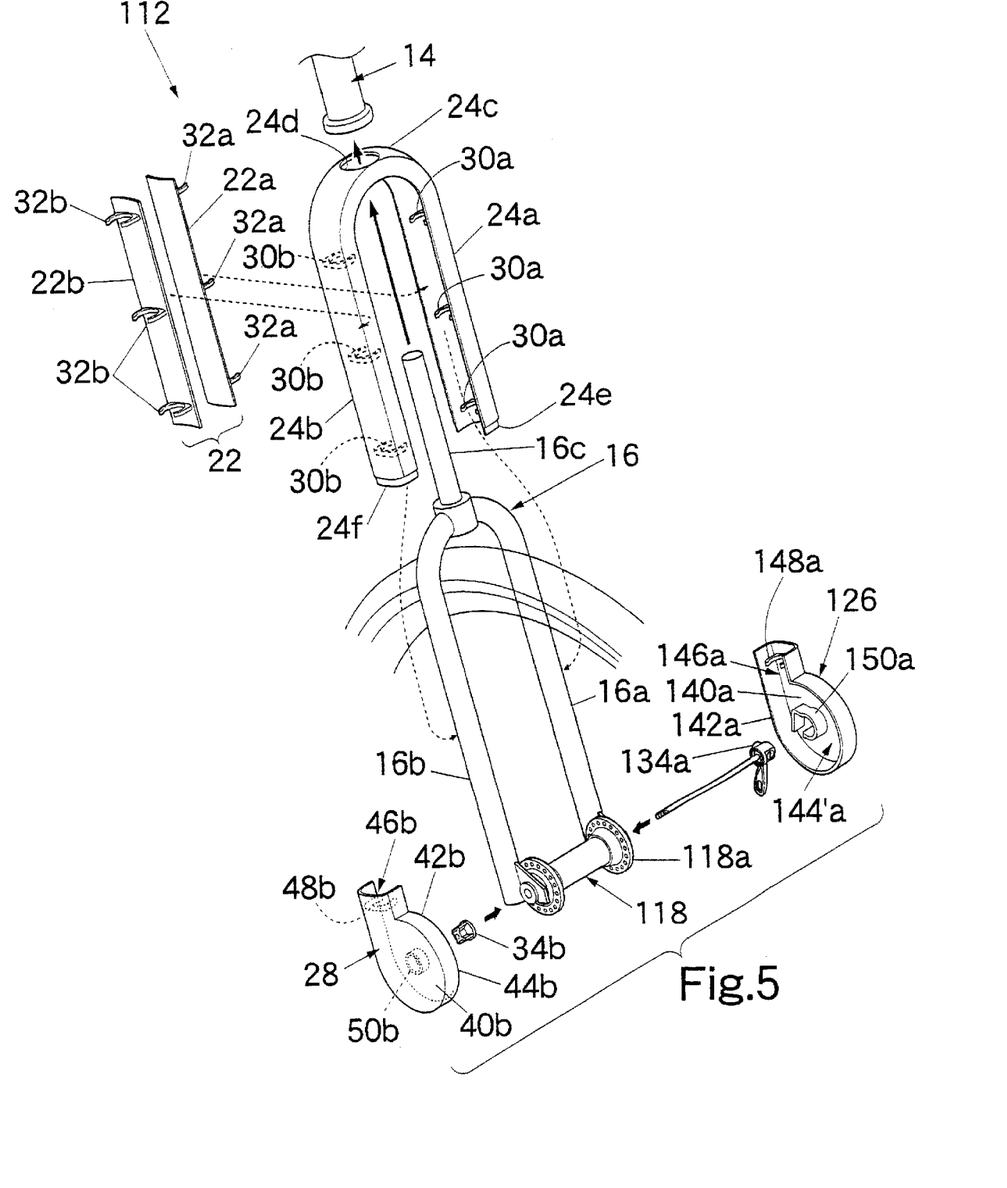
FIG. 5 is and exploded side perspective view of the front fork with the quick release hub and the bicycle fork cover in accordance with the second embodiment of the present invention.

Referring now to FIGS. 4 and 5, a bicycle fork/hub cover assembly 112 is illustrated in accordance with a second embodiment of the present invention. Basically, the bicycle fork/hub cover assembly 112 is identical to the first embodiment, except that the bicycle fork/hub cover assembly 112 has been modified to be utilized with a quick release style hub 118. In other words, all of the parts of the bicycle fork/hub cover assembly 112 are identical to the parts of the bicycle fork/hub cover assembly 12, discussed above, except for the right hub cover member 126. In view of the similarities between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment will be omitted for the sake of brevity.

The right hub cover member 126 has a side wall 40a and a peripheral wall 142a extending substantially perpendicularly from the peripheral edge of the side wall 140a. The side wall 140a and a peripheral wall 142a are configured to form a right enlarged cup-shaped part 144a that covers the right spoke flange 118a. The side wall 140a and a peripheral wall 142a are also configured to form a connecting part 146a that covers the lower free end of the right fork tube 16a. The right connecting 146a is configured to mate with the reduced sections 24e of the right outside fork tube cover section 24a so as to provide an attractive appearance. The connecting part is provided with a snap-on fastening element in the form of a C-shaped clip 148a. The right enlarged cup-shaped part 144a also includes a snap-on fastening element in the form of a right hub axle accommodating member 148a for frictionally engaging the quick release lever 134a of the hub 118. In this embodiment, the right hub axle accommodating member 150a is a discontinuous flange with a cutout for accommodating the quick release lever 134a of the hub 118.

As used herein, the following directional terms "forward, rearward, upward, above, downward, vertical, horizontal, below and transverse" as well as any other similar directional terms refer to those directions of a bicycle in its normal riding position, with the bicycle fork/hub cover assembly 12 or 112 attached thereto. Accordingly, these terms, as utilized to describe the bicycle fork/hub cover assembly 12 or 112 in the claims, should be interpreted relative to bicycle 10 in its normal riding position.

Also, terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A cover assembly comprising:
   a right hub cover section having a right enlarged part dimensioned and configured to substantially cover a right spoke flange of a hub, as viewed in a first axial direction along a longitudinal axis of an axle of said hub, and at least one fastening element; and
   a left hub cover section having a left enlarged part dimensioned and configured to substantially cover a left spoke flange of said hub, as viewed in a second axial direction along said longitudinal axis that is opposite to said first axial direction, and at least one fastening element,
   said fastening elements of said right and left hub cover sections being configured to fixedly attach said cover assembly to a front fork.

2. The cover assembly according to claim 1, wherein said at least one fastening element of said right hub cover section includes a clip member, and said at least one fastening element of said left hub cover section includes a clip member.

3. The cover assembly according to claim 1, wherein said at least one fastening element of said right hub cover section includes a right hub axle accommodating member, and said at least one fastening element of said left hub cover section includes a left hub axle accommodating member.

4. The cover assembly according to claim 3, wherein said right and left hub cover sections have right and left side walls, respectively, and said right and left hub axle accommodating members are tubular flanges extending from said right and left side walls of said right and left hub cover sections.

5. The cover assembly according to claim 4, wherein said at least one fastening element of said right hub cover section includes a clip member, and said at least one fastening element of said left hub cover section includes a clip member.

6. A cover assembly comprising:
   a right hub cover section having a right side wall configured to cover a right hub end, and at least one fastening element; and
   a left hub cover section having a left side wall configured to cover a left hub end, and at least one fastening element, said right side wall of said right hub cover section having a right peripheral wall extending from said right side wall to form a right cup-shaped member with a right fork tube cutout formed in said right peripheral wall; and
   said left side wall of said left hub cover section having a left peripheral wall extending from said left side wall to form a left cup-shaped member with a left fork tube cutout formed in said left peripheral wall.

7. The cover assembly according to claim 6, wherein said right and left side walls have substantially planar exterior surfaces.

8. The cover assembly according to claim 7, wherein said right and left peripheral walls are partial cylinders that extend substantially perpendicular to said right and left side walls.

9. The cover assembly according to claim 6, wherein said right hub cover section further includes a right connecting part having a substantially U-shaped cross section that extends radially from said right peripheral wall at said right fork tube cutout; and
   said left hub cover section further includes a left connecting part having a substantially U-shaped cross section that extends radially from said left peripheral wall at said left fork tube cutout.

10. The cover assembly according to claim 9, further comprising
    a right outside fork tube cover section having a right lower end and a right upper end with said right lower end configured to extend from said right connecting part of said right hub cover section; and
    a left outside fork tube cover section having a left lower end and a left upper end with said left lower end configured to extend from said left connecting part of said left hub cover section.

11. The cover assembly according to claim 10, wherein said right and left outside fork tube cover sections are coupled together by a middle section.

12. The cover assembly according to claim 11, wherein said right and left outside fork tube cover sections and said middle section are integrally formed from a one-piece, unitary member.

13. The cover assembly according to claim 10, further comprising
    at least one fastening element coupled to said right outside fork tube cover section; and at least one fastening element coupled to said left outside fork tube cover section.

14. The cover assembly according to claim 10, further comprising
a right inside fork tube cover section coupled to said right outside fork tube cover section to form an elongated right fork tube cover; and
a left inside fork tube cover section coupled to said left outside fork tube cover section to form an elongated left fork tube cover.

15. The cover assembly according to claim 14, further comprising
at least one fastening element coupled to one of said right outside fork tube cover section and said right inside fork tube cover section; and
at least one fastening element coupled to one of said left outside fork tube cover section and said left inside fork tube cover section.

16. The cover assembly according to claim 14, wherein said right and left outside fork tube cover sections are coupled together by a middle section.

17. The cover assembly according to claim 16, wherein said right and left outside fork tube cover sections and said middle section are integrally formed from a one-piece, unitary member.

18. The cover assembly according to claim 16, wherein said right and left outside fork tube cover sections and said middle section form an inverted U-shaped member with a center opening formed in said middle section.

19. The cover assembly according to claim 18, wherein said right and left outside fork tube cover sections have substantially U-shaped transverse cross sections.

20. The cover assembly according to claim 13, wherein said right and left outside fork tube cover sections have substantially U-shaped transverse cross sections.

21. A cover assembly comprising:
a right hub cover section having a right side wall configured to cover a right hub end, and at least one fastening element; and
a left hub cover section having a left side wall configured to cover a left hub end, and at least one fastening element, said at least one fastening element of said right hub cover section including a right hub axle accommodating member, and said at least one fastening element of said left hub cover section including a left hub axle accommodating member,
one of said right and left hub axle accommodating members being a tubular flange extending from a corresponding one of said right and left side walls of said right and left hub cover sections, and the other of said right and left hub axle accommodating members being a discontinuous flange extending from a corresponding other one of said right and left side walls of said right and left hub cover sections.

22. The cover assembly according to claim 21, wherein said at least one fastening element of said right hub cover section includes a clip member, and said at least one fastening element of said left hub cover section includes a clip member.

23. A cover assembly comprising:
an outside cover portion including a right outside fork tube cover section, and a left outside fork tube cover section;
an inside cover portion including a right inside fork tube cover section, and a left inside fork tube cover section; and
fastening elements coupled to said outside cover portion and said inside cover portion.

24. The cover assembly according to claim 23, wherein said right and left outside fork tube cover sections are coupled together by a middle section.

25. The cover assembly according to claim 24, wherein said right and left outside fork tube cover sections and said middle section are integrally formed from a one-piece, unitary member.

26. The cover assembly according to claim 24, wherein said right and left outside fork tube cover sections and said middle section form an inverted U-shaped member with a center opening formed in said middle section.

27. The cover assembly according to claim 26, wherein said right and left outside fork tube cover sections have substantially U-shaped transverse cross sections.

28. The cover assembly according to claim 23, wherein said right outside fork tube cover section and said right inside fork tube cover section are coupled together to form an elongated right fork tube; and
said left outside fork tube cover section and said left inside fork tube cover section are coupled together to form an elongated left fork tube.

29. The cover assembly according to claim 23, wherein said fastening elements are snap-on clips.

30. The cover assembly according to claim 23, wherein said outside cover portion further includes right and left hub cover sections that are coupled to said right and left outside fork tube cover sections, respectively.

31. The cover assembly according to claim 30, wherein said right hub cover section includes a right side wall configured to cover a right hub end, and at least one fastening element; and
said left hub cover section includes a left side wall configured to cover a left hub end, and at least one fastening element.

32. The cover assembly according to claim 31, wherein said right side wall of said right hub cover section has a right peripheral wall extending from said right side wall to form a cup-shaped member with a right fork tube cutout formed in said right peripheral wall; and
said left side wall of said left hub cover section has a left peripheral wall extending from said left side wall to form a cup-shaped member with a left fork tube cutout formed in said left peripheral wall.

33. The cover assembly according to claim 32, wherein said right hub cover section further includes a right connecting part having a substantially U-shaped cross section that extends radially from said right peripheral wall at said right fork tube cutout; and
said left hub cover section further includes a left connecting part having a substantially U-shaped cross section that extends radially from said left peripheral wall at said left fork tube cutout.

34. A cover assembly comprising:
a right hub cover section having a right side wall configured to cover a right hub end, and at least one fastening element;
a left hub cover section having a left side wall configured to cover a left hub end, and at least one fastening element; and
a cover member extending between said right and left hub cover sections, said cover member being configured to cover right and left fork tubes and a top portion of a front fork, said cover member having fastening elements configured to fixedly attach said cover member to said front fork.

35. The cover assembly according to claim 34, wherein said cover member has an outside cover portion including a right outside fork tube cover section, and a left outside fork tube cover section; and an inside cover portion including a right inside fork tube cover section, and a left inside fork tube cover section.

36. The cover assembly according to claim 35, wherein said right and left outside fork tube cover sections are coupled together by a middle section.

37. The cover assembly according to claim 36, wherein said right and left outside fork tube cover sections and said middle section are integrally formed from a one-piece, unitary member.

38. The cover assembly according to claim 36, wherein said right and left outside fork tube cover sections and said middle section form an inverted U-shaped member with a center opening formed in said middle section.

39. The cover assembly according to claim 35, wherein said right outside fork tube cover section and said right inside fork tube cover section are coupled together to form an elongated right fork tube; and said left outside fork tube cover section and said left inside fork tube cover section are coupled together to form an elongated left fork tube.

40. The cover assembly according to claim 35, wherein said right and left hub cover sections are coupled to said right and left outside fork tube cover sections, respectively.

* * * * *